C. T. BARGER.
HORSE COLLAR.
APPLICATION FILED JUNE 4, 1917.
1,270,588.
Patented June 25, 1918.
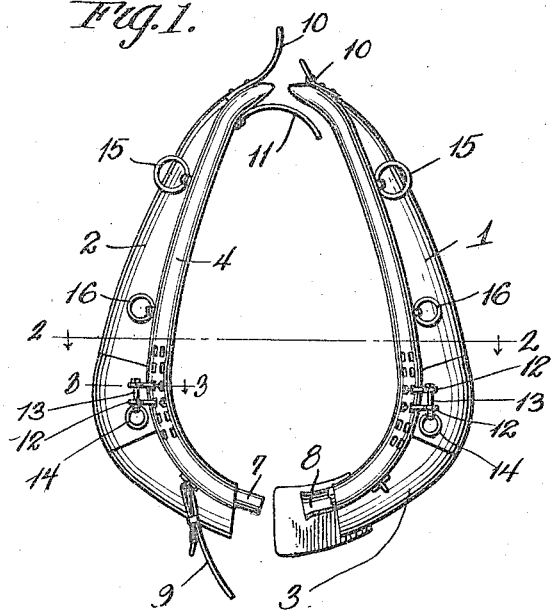
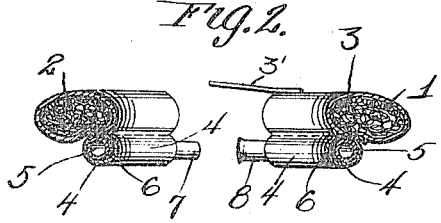
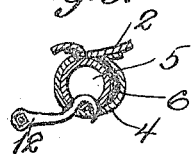
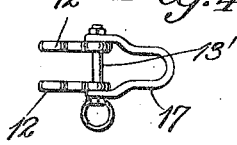
WITNESSES
Guy M. Spring
Wm. H. Mulligan
INVENTOR
Clyde T. Barger
BY Richard B. Owen
ATTORNEY

UNITED STATES PATENT OFFICE.

CLYDE T. BARGER, OF HAYES, ILLINOIS.

HORSE-COLLAR.

1,270,588.

Specification of Letters Patent. Patented June 25, 1918.

Application filed June 4, 1917. Serial No. 172,741.

*To all whom it may concern:*

Be it known that I, CLYDE T. BARGER, a citizen of the United States, residing at Hayes, in the county of Douglas and State of Illinois, have invented certain new and useful Improvements in Horse-Collars, of which the following is a specification.

This invention relates to animal harness, and more particularly to a horse collar, the primary object being to provide an improved construction, whereby the collar will possess the necessary rigidity and durability without the usual hames generally employed on heavy horse collars of this character.

One of the principal objects of the invention is to provide a strong and durable horse collar that will be materially lightened in weight by eliminating the usual solid hames.

The invention also aims to provide a collar that may be permanently fixed to the harness but which may be easily removed from the animal's neck, or replaced thereon without unbuckling the harness from the collar.

A further object of the invention is to provide an improved horse collar that will not break and become defective at the throat as is now generally the case with the ordinary continuous collars.

A further object of this invention is the provision of an animal harness which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a front elevation.

Fig. 2 is a section on the line 2—2 of Fig. 1.

Fig. 3 is a slightly enlarged detail section on the line 3—3 of Fig. 1.

Fig. 4 is a detail of a modification of one part of the invention.

Referring to the drawing, wherein is illustrated the preferred form of my invention, and in which like numerals of reference indicate corresponding parts throughout the several views, the collar comprises the two side sections 1 and 2 which are entirely independent of each other, but may be quickly and easily connected to form a complete collar. Each section includes the pad 3, stuffed with the usual padding material and covered with leather, heavy fabric or the like. Attached to the lower end of the section 1 is a throat shield 3' which consists of a piece of leather or the like, adapted to overlap the end of the other section 2 when the lower ends of the sections are brought together to close the throat of the collar.

Attached to each section is a leather casing 4, shown clearly in cross section in Fig. 3 of the drawing. It will be observed that this casing is of tubular formation and consists of a strip of leather having its marginal edges sewed or laced to the corresponding section to which it is attached. The upper ends of the casings are sealed by sewing the open ends of the casing together. It is also to be observed that the casing conforms to the configuration of the section to which it is attached.

Mounted in each section 4 is a length of tubing or piping 5, the same being curved and shaped to fit the casing, whereby it may conform to the contour of the sections to properly fit the horse's neck. The tube 4, however, is slightly larger than the piping and the space between the piping and the inner side of the casing is stuffed with padding material 6 thus preventing chafing or injury to the animal at the point where the casing contacts with the hide thereof. The lower end of the casings are open and each pipe is projected beyond the open end thereof as shown to advantage in Figs. 1 and 2 of the drawing. The end 7 of one of the pipes 5 is reduced in diameter, so that it is smaller than the end 8 of the other pipe, the latter having its terminal flared outwardly to facilitate the insertion of the end 7, and it will be obvious that when these two ends are joined together, the throat of the collar will be closed, the sections meeting flush to provide a neat and even connection. Fixed to each casing adjacent the lower end thereof is a suitable clip to which a fastening strap 9 is adapted to be fastened, whereby the throat of the collar may be held in closed position and be prevented from opening until the fastening strap is unbuckled.

Attached to the upper ends of the casing, and riveted through the ends of the pipes are the upper fastening straps 10 adapted to be joined together by a buckle or the like to close the top of the collar from the back of the neck of the animal. Fastened near the meeting ends of the casing 4 is a shield 11 which consists of a suitable strip of leather or the like to rest upon the back of the neck of the animal for preventing chafing by the ends of the collar.

Each casing, as shown in Fig. 1 of the drawing, is provided with a plurality of openings arranged in pairs at a point near the greatest curve in the casing. The pipe 5 in each casing is also provided with a plurality of corresponding openings alined with the openings in the casing. These openings are for the purpose of attaching hooks 12 arranged in pairs on each section and passed over adjacent openings in the said series. These hooks are held in spaced relation by a bolt 13 to which a ring 14 is attached for the purpose of receiving the ends of the breast straps of the harness. It will be obvious, that these attaching hooks 12 may be placed in any of the openings thereby providing an adjustment without altering the breast straps. Adjacent the upper ends, the pipes 5 carry lugs projecting through openings in the casing, and each lug carries a ring 15 through which the check-rein is passed in the usual manner. At a point approximately mid-way between the ends of the casing, is a relatively small ring 16 for receiving the breeching strap in the manner similar to the construction of the ordinary hames. In Fig. 4, I have illustrated the hooks 12 as being connected by a bolt 13', the ends of which receive a clevis 17 as a substitute for the ring 14 in the above described form. This clevis may receive the clips usually carried at the ends of the traces in heavy harnesses.

From the foregoing it will be observed that a very simple and durable animal harness has been provided, the details of which embody the preferred form. I desire it to be understood, however, that slight changes in the minor details of construction may be made without departing from the spirit of the invention or the scope of the claims hereunto appended.

I claim:

1. A horse collar comprising a pad including half sections, each section being provided with a tubular casing near its inner edge, a length of piping received in each casing and shaped to conform to the curve of the casing, and a padding interposed between the proximate surfaces of the piping and casing.

2. A horse collar comprising a pad including half sections, each section being provided with a tubular casing near its inner edge, a length of piping received in each casing and shaped to conform to the curve of the casing, a padding interposed between the proximate surfaces of the piping and casing, the ends of the piping being extended beyond the ends of the casings, one end being adapted for the reception of the corresponding end of the other piping, and a fastening element for maintaining the meeting ends of the piping in fixed position.

3. A horse collar comprising a pad including complementary sections adapted to be connected together, a tubular casing attached to the front of each section, adjacent the proximate edges thereof, the said casing having a plurality of openings formed therein, and a length of piping received in each casing and having openings alined with the openings in the said casing.

4. A horse collar comprising a pad including complementary sections adapted to be connected together, a tubular casing attached to the front of each section, adjacent the proximate edges thereof, the said casing having a plurality of openings formed therein, a length of piping received in each casing and having openings alined with the openings in the said casing, the lower ends of the lengths of piping being projected beyond the ends of the casings, and means for connecting the projected ends together when the pad sections are secured.

5. A horse collar comprising a pad including complementary sections adapted to be connected together, a tubular casing attached to the front of each section, adjacent the proximate edges thereof, the said casing having a plurality of openings formed therein, a length of piping received in each casing and having openings alined with the openings in the said casing, the lower ends of the length of piping being projected beyond the ends of the casings, means for connecting the projected ends together when the pad sections are secured, and hooks arranged in pairs, each pair being received in the adjacent openings in the said sections and piping, and fastening elements carried by the said hooks.

In testimony whereof I affix my signature in presence of two witnesses.

CLYDE T. BARGER.

Witnesses:
JOHN G. WELDON,
E. J. KICHLER,

Copies of this patent may be obtained for five cents each, by addressing the "Commissioner of Patents, Washington, D. C."